United States Patent
Graziosi et al.

(10) Patent No.: US 12,445,613 B2
(45) Date of Patent: Oct. 14, 2025

(54) DISPLACEMENT QUANTIZATION SYNTAX

(71) Applicants: SONY GROUP CORPORATION, Tokyo (JP); Sony Corporation of America, New York, NY (US)

(72) Inventors: Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 0 days.

(21) Appl. No.: 18/680,551

(22) Filed: May 31, 2024

(65) Prior Publication Data
US 2025/0220181 A1 Jul. 3, 2025

Related U.S. Application Data (60) Provisional application No. 63/617,112, filed on Jan. 3, 2024.

(51) Int. Cl.
*H04N 19/124* (2014.01)
*G06T 9/00* (2006.01)

(52) U.S. Cl.
CPC .......... *H04N 19/124* (2014.11); *G06T 9/001* (2013.01)

(58) Field of Classification Search
None
See application file for complete search history.

(56) References Cited

U.S. PATENT DOCUMENTS

| | | | |
|---|---|---|---|
| 2022/0210471 A1* | 6/2022 | Zhang | H04N 19/136 |
| 2023/0290063 A1* | 9/2023 | Mammou | G06T 17/20 |

FOREIGN PATENT DOCUMENTS

| | | | | |
|---|---|---|---|---|
| WO | WO-2024216090 A1 * | 10/2024 | | H04N 19/63 |
| WO | WO-2025014957 A2 * | 1/2025 | | G06T 9/001 |
| WO | WO-2025048542 A1 * | 3/2025 | | H04N 19/597 |

OTHER PUBLICATIONS

STIC provided translation of Xu et al (WO2025/014957 A2) (Year: 2024).*
WD, "Information technology—Coded representation of immersive media—Part 29: Video-based dynamic mesh coding (V-DMC)", 143. MPEG Meeting; Geneva; No. n23075, Aug. 31, 2023, XP030323752.
Danillo B Graziosi et al: "[V-DMC] [WD] [SW] Displacement quantization proposal", 145. MPEG Meeting; Jan. 22, 2024-Jan. 26, 2024; Online;, No. m65887, XP030313.
Dean Han et al: "[G-PCC] Delta QP for Layer of Lifting/Predicting Transform and Raht", 126. MPEG Meeting; Mar. 25, 2019-Mar. 29, 2019; Geneva; No. m47834, XP030212138.

* cited by examiner

*Primary Examiner* — Tyler W. Sullivan
(74) *Attorney, Agent, or Firm* — Haverstock & Owens, A Law Corporation (57) ABSTRACT

Quantization-related parameters are removed from the lifting transform parameters structure and have an independent structure referred to as quantization parameters that will contain the quantization-related information. The modified implementation has no performance difference from a reference implementation, and the modified implementation now can address displacement quantized values, even if they were not transformed.

20 Claims, 3 Drawing Sheets

DISPLACEMENT QUANTIZATION SYNTAX

CROSS-REFERENCE TO RELATED APPLICATION(S)

This application claims priority under 35 U.S.C. § 119 (e) of the U.S. Provisional Patent Application Ser. No. 63/617,112, filed Jan. 3, 2024 and titled, "DISPLACEMENT QUANTIZATION SYNTAX," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

The specification for the Video-based Dynamic Mesh Compression (VDMC) standard had an issue with the quantization parameters. The quantization parameters were being transmitted inside the vdmc_lifting_transform_parameters structure, which is only transmitted when the lifting transform is selected.

SUMMARY OF THE INVENTION

Quantization-related parameters are removed from the lifting transform parameters structure and have an independent structure referred to as quantization parameters that will contain the quantization-related information. The modified implementation has no performance difference from a reference implementation, and the modified implementation now can address displacement quantized values, even if they were not transformed.

In one aspect, a method programmed in a non-transitory memory of a device comprises storing lifting transform information in a lifting transform structure, storing quantization parameter information in a quantization parameter structure, wherein the lifting transform structure is independent from the quantization parameter structure. The method further comprises generating the lifting transform structure and the quantization parameter structure. The method further comprises generating one or more flags to indicate the quantization parameter structure. The method further comprises encoding the lifting transform information and the quantization parameter information. The method further comprises reconstructing a mesh with the lifting transform information and the quantization parameter information. The method further comprises encoding displacement information related to a mesh. The displacement information is quantized and stored as the quantization parameter information.

In another aspect, an apparatus comprises a non-transitory memory for storing an application, the application for: storing lifting transform information in a lifting transform structure, storing quantization parameter information in a quantization parameter structure, wherein the lifting transform structure is independent from the quantization parameter structure and a processor coupled to the memory, the processor configured for processing the application. The application is further configured for generating the lifting transform structure and the quantization parameter structure. The application is further configured for generating one or more flags to indicate the quantization parameter structure. The application is further configured for encoding the lifting transform information and the quantization parameter information. The application is further configured for reconstructing a mesh with the lifting transform information and the quantization parameter information. The application is further configured for encoding displacement information related to a mesh. The displacement information is quantized and stored as the quantization parameter information.

In another aspect, a system comprises an encoder configured for: storing lifting transform information in a lifting transform structure, and storing quantization parameter information in a quantization parameter structure, wherein the lifting transform structure is independent from the quantization parameter structure and a decoder configured for reconstructing a mesh with the lifting transform information and the quantization parameter information. The encoder is further configured for generating the lifting transform structure and the quantization parameter structure. The encoder is further configured for generating one or more flags to indicate the quantization parameter structure. The encoder is further configured for encoding the lifting transform information and the quantization parameter information. The encoder is further configured for encoding displacement information related to a mesh. The displacement information is quantized and stored as the quantization parameter information.

DETAILED DESCRIPTION OF THE PREFERRED EMBODIMENT

The Video-based Dynamic Mesh Compression (VDMC) standard involves meshes that are encoded by generating a low resolution mesh and dividing the mesh for more flexibility. The sub-divided meshes have many small triangles. For each vertex in each triangle, the displacement information to the surface of the mesh is sent/encoded. The displacement information with the low resolution mesh is able to be used to reconstruct the high resolution mesh. The displacement is how much a vertex moves in 3D space. The displacements are quantized (resulting in quantization parameters) and encoded. The displacements are able to be transformed using a lifting transform as well.

To address the issue of the quantization parameters being transmitted inside the vdmc_lifting_transform_parameters structure, the quantization-related parameters are removed from the current lifting transform specific structure, and an equivalent (or similar) structure dedicated to the signaling of the quantization parameters only is generated. In other words, elements related to quantization are stored in one structure, and elements related to the lifting transform are stored in another structure. The structures are independent from each other. The quantization is able to be adjusted as desired, and the lifting transform is able to be adjusted as desired without either affecting the other. Flags are generated in Album Sequence Parameter Set (ASPS), Album Frame Parameter Set (AFPS) and Patch Data Unit (PDU) to also indicate the presence of the quantization parameter structure. The implementation is incorporated within TMM v6.0.

Figure 1:
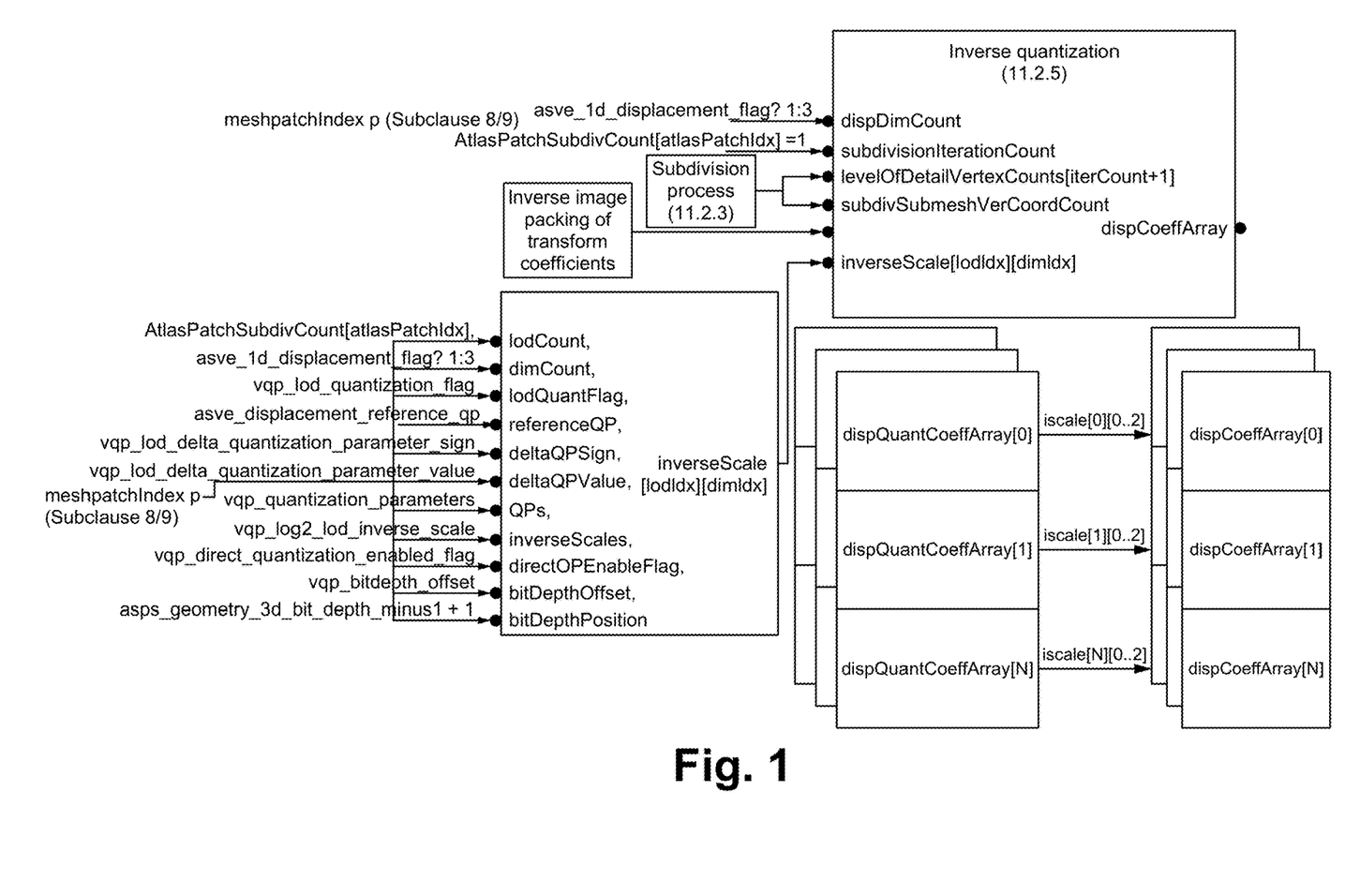
FIG. 1 illustrates a diagram of an inverse quantization specification according to some embodiments.

FIG. 1 shows a diagram of the inverse quantization function for the specification. The modifications to the specification to include the new structure vdmc_quantization_parameters( ), the modifications in the current vdmc_lifting_transform_parameters( ) structure, and the changes in the reconstruction section.

| Syntax |
|---|

| Atlas sequence parameter set V-DMC extension syntax | |
|---|---|
| | Descriptor |
| asps_vdmc_extension( ) { | |
|   asve_subdivision_method | u(3) |
|   if( asve_subdivision_method != 0 ) { | |
|     asve_subdivision_iteration_count | u(8) |
|     AspsSubdivisionCount = asve_subdivision_iteration_count | |
|   } else | |
|     AspsSubdivisionCount = 0 | |
|   asve_1d_displacement_flag | u(1) |
|   vdmc_quantization_parameters( 0, AspsSubdivisionCount ) | |
|   asve_transform_method | u(3) |
|   if(asve_transform_method == LINEAR_LIFTING) { | |
|     vdmc_lifting_transform_parameters( 0, AspsSubdivisionCount ) | |
|   } | |
|   asve_num_attribute_video | u(7) |
|   for(i=0; i< asve_num_attribute_video; i++){ | |
|     asve_attribute_type_id[ i ] | u(8) |
|     asve_attribute_frame_width[ i ] | ue(v) |
|     asve_attribute_frame_height[ i ] | ue(v) |
|     asve_attribute_subtexture_enabled_flag[ i ] | u(1) |
|   } | |
|   asve_packing_method | u(1) |
|   asve_projection_textcoord_enable_flag | u(1) |
|   if( asve_projection_textcoord_enable_flag ){ | |
|     asve_projection_textcoord_mapping_method | u(2) |
|     asve_projection_textcoord_scale_factor | fl(64) |
|   } | |
|   asve_displacement_reference_qp | u(7) |
|   asve_vdmc_vui_parameters_present_flag | u(1) |
|   if( asve_vdmc_vui_parameters_present_flag ) | |
|     vdmc_vui_parameters( ) | |
| } | |

| Quantization parameters syntax | |
|---|---|
| | Descriptor |
| vdmc_quantization_parameters( qpIndex, subdivisionCount ){ | |
|   vqp_lod_quantization_flag[ qpIndex ] | u(1) |
|   vqp_bitdepth_offset[ qpIndex ] | se(v) |
|   if( vqp_lod_quantization_flag[ qpIndex ] == 0 ) { | |
|     for( k = 0; k < DisplacementDim; k++) { | |
|       vqp_quantization_parameters[ qpIndex ][ k ] | u(7) |
|       for( i=0 ; i < subdivisionCount + 1; i++ ) | |
|         QuantizationParameter[ qpIndex ][ i ][ k ] = | |
|     vqp_quantization_parameters[ qpIndex ][ k ] | |
|       vqp_log2_lod_inverse_scale[ qpIndex ][ k ] | u(2) |
|     } | |
|   } else { | |
|     for( i=0 ; i < subdivisionCount + 1; i++ ) { | |
|       for( k = 0; k < DisplacementDim; k++ ) { | |
|         vqp_lod_delta_quantization_parameter_value[ qpIndex ][ i ][ k ] | ue(v) |
|         if( vqp_lod_delta_quantization_parameter_value[ qpIndex ][ i ][ k ] ) | |
|           vqp_lod_delta_quantization_parameter_sign[ qpIndex ][ i ][ k ] | u(1) |
|         if( qpIndex = 0 ) | |
|           QuantizationParameter[ qpIndex ][ i ][ k ] = | |
|             asve_displacement_reference_qp + ( 1 − 2 * | |
|             vqp_lod_delta_quantization_parameter_sign[ qpIndex ][ i ][ k ] ) * | |
|             vqp_lod_delta_quantization_parameter_value[ qpIndex ][ i ][ k ] | |
|         else | |
|           QuantizationParameter[ qpIndex ][ i ][ k ] = | |
|             QuantizationParameter[ qpIndex − 1 ][ i ][ k ] + ( 1 − 2 * | |
|             vqp_lod_delta_quantization_parameter_sign[ qpIndex ][ i ][ k ] ) * | |

| Syntax |
| --- |
| ```
    vqp_lod_delta_quantization_parameter_
        value[ qpIndex ][ i ][ k ]
      }
    }
  }
  vqp_direct_quantization_enabled_flag[ qpIndex ]                u(1)
}
``` |

| Lifting transform parameters syntax | Descriptor |
| --- | --- |
| ```
vdmc_lifting_transform_parameters( ltpIndex, subdivisionCount ){
  vltp_skip_update_flag[ ltpIndex ]
  vltp_lod_lifting_parameter_flag[ ltpIndex ]
  for( i=0 ; i < subdivisionCount + 1; i++ ) {
    if( vltp_skip_update_flag[ ltpIndex ] )
      UpdateWeight[ ltpIndex ][ i ] = 0
    else {
      vltp_adaptive_update_weight_flag[ i ]
      if( vltp_lod_lifting_parameter_flag[ ltpIndex ] == 1 || i == 0 ) {
        if( vltp_adaptive_update_weight_flag[ i ] ) {
          vltp_lifting_update_weight_
              numerator[ ltpIndex ][ i ]
          vltp_lifting_update_weight_denominator_
              minus1[ ltpIndex ][ i ]
          UpdateWeight[ ltpIndex ][ i ] =
              ( vltp_lifting_update_weight_numerator[ ltpIndex ][ i ] ) ÷
              ( vltp_lifting_update_weight_denominator_minus1[
ltpIndex ][ i ] + 1 )
        } else {
          vltp_log2_lifting_update_weight[ ltpIndex ][ i ]
          UpdateWeight[ ltpIndex ][ i ] =
              1 ÷ ( 1 << vltp_log2_lifting_update_
                  weight[ ltpIndex ][ i ] )
        }
      } else {
        UpdateWeight[ ltpIndex ][ i ] = UpdateWeight[ ltpIndex ][ 0 ]
      }
    }
  }
  vltp_log2_lifting_prediction_weight[ ltpIndex ]
  PredictionWeight[ ltpIndex ] = 1 ÷ ( 1 << vltp_log2_lifting_
      prediction_weight[ ltpIndex ] )
}
``` | u(1)<br>u(1)<br><br><br><br><br>u(1)<br><br><br><br>ue(v)<br><br>ue(v)<br><br><br><br><br><br>ue(v)<br><br><br><br><br><br><br><br>ue(v) |

Semantics
Quantization Parameters Semantics vqp_lod_quantization_flag[qpIndex] equal to 1 indicates that the quantization parameter will be sent per level-of-detail using delta coding. vqp_lod_quantization_flag[qpIndex] equal to 0 indicates that the quantization parameter will be the same for all level-of-details. qpIndex is the index of the quantization parameter set.

vqp_bitdepth_offset[qpIndex] indicates the bit depth offset value applied to the quantization process of the displacements. qpIndex is the index of the quantization parameter set.

vqp_quantization_parameters[qpIndex][k] indicates the quantization parameter to be used for the inverse quantization of the kth-component of the displacements. The value of vqp_quantization_parameters[qpIndex][k] shall be in the range of 0 to 100, inclusive. qpIndex is the index of the quantization parameter set.

vqp_log 2_lod_inverse_scale[qpIndex][k] indicates the scaling factor applied to the kth-component of the displacements for each level of detail. qpIndex is the index of the quantization parameter set.

vqp_lod_delta_quantization_parameter_value[qpIndex][i][k] specifies the absolute difference of quantization parameter value between the value asve_displacement_reference_qp and the quantization parameter for the ith-layer and kth-component. When not present, the value of vqp_lod_delta_quantization_parameter_value[qpIndex][i][k] is inferred as 0. qpIndex is the index of the quantization parameter set. The value of QuantizationParameter of each LoD layer shall be in the range of 0 to 100.

vqp_lod_delta_quantization_parameter_sign[qpIndex][i][k] specifies the sign of difference of quantization parameter value between the value asve_displacement_reference_qp and the quantization parameter for the ith-layer and kth-component.

vqp_lod_delta_quantization_parameter_sign[qpIndex][i][k] equal to 0 indicate the difference is positive. vqp_lod_delta_quantization_parameter_sign[qpIndex][i][k] equal to 1 indicate the difference is negative. When not present, the value of vqp_lod_delta_quantization_parameter_sign[qpIndex][i][k] is inferred as 0. qpIndex is the index of the quantization parameter set.

vqp_direct_quantization_enabled_flag[qpIndex] equal to 1 indicates that the inverse scale factor is derived from the signaled displacement quantization parameter directly and computed as follows:

InverseScale[ qpIndex ][ i ][ k ] = 1 ÷ QuantizationParameter[ qpIndex ][ i ][ k ]
vqp_direct_quantization_enabled_flag[ qpIndex ] equal to 0 indicates that the inverse scale factor shall be computed as follows:
   bitDepthPosition = asps_geometry_3d_bit_depth_minus1 + 1
   InverseScale[ qpIndex ][ i ][ k ] = pow(0.5, 16 + vqp_bitdepth_offset[ qpIndex ] − bitDepthPosition + (4 − QuantizationParameters[ qpIndex ][ i ][ k ]) ÷ 6)
qpIndex is the index of the quantization parameter set.

Lifting Transform Parameters Semantics vltp_skip_update_flag[ltpIndex] equal to 1 indicates the step of the lifting transform applied to the displacement is skipped in the vdmc_lifting_transform_parameters(lptIndex, subdivisionCount) syntax structure. ItpIndex is the index of the lifting transform parameter set. vltp_lod_lifting_parameter_flag[ltpIndex] equal to 1 indicates the lifting transform parameters are signalled at LoD level. vltp_lod_lifting_parameter_flag[ltpIndex] equal to 0 indicates the lifting transform parameters applies across LoDs. ItpIndex is the index to lifting transform parameter set.

vltp_adaptive_update_weight_flag[ltpIndex][i] equal to 1 indicates the update weights is adapted at the ith level of detail, whereas the update weight is signalled and represented as the ratio of numerator and denominator values.

wavelet transform of the ith level of detail. ItpIndex is the index of the lifting transform parameter set.

Reconstruction:

Submesh Reconstruction Process

General

Next, an inverse packing process is invoked with the parameters width, height, dispQuantCoeffFrame, subdivisionIterationCount, levelOfDetailVertexCounts, subdivSubmesh VerCoordCount, blockSize, bitDepth, dispPackingOrder, and videoChromaFormat, as inputs, and the parameter dispQuantCoeffArray as output.

For the inverse quantization of the unpacked values, the inverse scale 2D array iscales[lodIdx][dimIdx] is derived in the following way:

```
lodCount = subdivisionIterationCount + 1
lodQuantizationFlag = vqp_lod_quantization_flag[ QpIndex ]
if( lodQuantizationFlag ){
   for( lodIdx = 0; lodIdx < lodCount; lodIdx++ ) {
      for( dimIdx = 0; dimIdx < DisplacementDim; dimIdx++ ) {
         iscale[ lodIdx ][ dimIdx ] = InverseScale[ QpIdx ][ lodIdx ][ dimIdx ]
      }
   }
} else {
   for( dimIdx = 0; dimIdx < DisplacementDim; dimIdx++ ) {
      iscale[ 0 ][ dimIdx ] = InverseScale[ QpIdx ][ 0 ][ dimIdx ]
      levelOfDetailInverseScale[ dimIdx ] =
         1 << vqp_log2_lod_inverse_scale[ QpIdx ][ dimIdx ]
   }
   for( lodIdx = 1; lodIdx < lodCount; lodIdx++ ) {
      for( dimIdx = 0; dimIdx < DisplacementDim; dimIdx++ ) {
         iscale[ lodIdx ][ dimIdx ] = iscale[ lodIdx − 1 ][ dimIdx ] *
            levelOfDetailInverseScale[ dimIdx ]
      }
   }
}
``` vltp_adaptive_update_weight_flag[i] equal to 0 indicates the update weight at ith level of detail is signalled as single value. ItpIndex is the index of the lifting transform parameter set.

vltp_lifting_update_weight_numerator[ltpIndex][i] indicates the numerator of the weight coefficients used for the update filter of the lifting transform of the ith level of detail. ItpIndex is the index of the lifting transform parameter set.

vltp_lifting_update_weight_denominator_minus1[ltpIndex][i] plus 1 indicates the denominator of the weight coefficients used for the update filter of the wavelet transform of the ith level of details. ItpIndex is the index of the lifting transform parameter set.

vltp_log 2_lifting_update_weight[ltpIndex][i] indicates the weighting coefficients used for the update filter of the wavelet transform of the ith level of detail. ItpIndex is the index of the lifting transform parameter set.

vltp_log 2_lifting_prediction_weight[ltpIndex][i] the weighting coefficients used for the prediction filter of the Then, an inverse quantization process is invoked with the parameters subdivisionIterationCount, levelOfDetailVertexCounts, subdivSubmesh VerCoordCount, dispQuantCoeffArray, and iscale as inputs, and the parameter dispCoeffArray as output.

The following variables are derived:

```
transformMethod = AtlasMeshpatchTransformMethod[ p ]
skipUpdate = vltp_skip_update_flag[ LtpIndex ]
for(i = 0; i < subdivisionIterationCount; i++ ){
   updateWeights[ i ] = UpdateWeight[ LtpIndex ][ i ]
}
predWeights = PredictionWeight[ LtpIndex ]
```

Then, an inverse transform process is invoked with the parameters subdivSubmesh VerCoordCount, dispCoeffArray, subdivisionIterationCount, levelOfDetailVerCoordFacesCounts, verCoordEdges, transformMethod, update Weight, predWeights, and skipUpdate as inputs, and the parameter dispArray as output.

Inverse Quantization
Inputs to this process are:
   a variable subdivisionIterationCount, indicating the number of subdivision iterations to be applied to the submesh,
   a 1D array levelOfDetailVertexCounts, of size (subdivisionIterationCount+1), indicating the number of vertices associated with each subdivision iteration,
   a variable subdivSubmesh VerCoordCount, indicating the number of vertex coordinates in the subdivided submesh,
   a 2D array dispQuantCoeffArray, of size subdivSubmesh VerCoordCount×3, indicating the quantized displacement transform coefficients.
   a variable subdivisionIterationCount, indicating the number of subdivision iterations to be applied to the submesh,
   a 2D array iscale, of size (subdivisionIterationCount+1)× DisplacementDim, indicating the inverse scale factor for each level-of-detail and dimension.
The output of this process is:
   a 2D array dispCoeffArray, of size subdivSubmesh VerCoordCount×DisplacementDim, indicating the dequantized displacement wavelet coefficients.
The inverse quantization process proceeds as follows:

```
vcount0 = 0
for( i = 0; i < subdivisionIterationCount; i++ ) {
  vcount1 = levelOfDetailCounts[ i ]
  for( v = vcount0; v < vcount1; v++ ) {
    for( d = 0; d < DisplacementDim; d++ ) {
      dispCoeffArray[ v ][ d ] = dispQuantCoeffArray[ v ][ d ] * iscale[ i ][ d ]
    }
  }
  vcount0 = vcount1
}
```

Inverse Transform
General
Inputs to this process are:
   a variable subdivSubmesh VerCoordCount, indicating the number of vertex coordinates in the subdivided submesh,
   a 2D array dispCoeffArray, of size subdivSubmesh VerCoordCount×DisplacementDim, indicating the dequantized displacement wavelet coefficients,
   a variable subdivisionIterationCount, indicating the number of subdivision iterations to be applied to the submesh,
   a 1D array levelOfDetailVertexCounts, of size (subdivisionIterationCount+1) indicating the number of vertices associated with each subdivision iteration,
   a 2D array verCoordEdges, of size subdivSubmesh VerCoordCount×2 which indicates for each vertex v produced by the subdivision process the indices a and b of the two vertices used to generated it (e.g., v is generated as the middle of the edge (a, b)),
   a variable transformMethod, indicating the method of transform.
   a 1D array update Weights, of size subdivSubmesh VerCoordCount, indicating the lifting update weight.
   a variable predWeights, indicating the lifting prediction weight.
   a variable skipUpdate, indicating whether the update operation should be skipped (when 1) or not (when 0).
The output of this process is:
   a 2D array dispArray, of size subdivSubmesh VerCoordCount×3, indicating the displacements to be applied to the mesh position.
If transformMethod is equal to LINEAR_LIFTING, then process is invoked with the parameters subdivSubmesh VerCoordCount, dispCoeffArray, subdivisionIterationCount, levelOfDetailVerCoordFacesCounts, verCoordEdges, update Weight, predWeights, and skipUpdate as inputs, and the parameter dispArray as output. Otherwise, the output 2D array dispArray is derived as follows:

```
for( t = 0; t < subdivSubmeshVerCoordCount; t++ ) {
  for( i = 0; i < 3; i++ ) {
    dispArray[ t ][ i ] = dispCoeffArray[ t ][ i ]
  }
}
```

Inverse Wavelet Transform
Inputs to this process are:
   a variable subdivSubmesh VerCoordCount, indicating the number of vertex coordinates in the subdivided submesh,
   a 2D array dispCoeffArray, of size subdivSubmesh VerCoordCount×DisplacementDim, indicating the dequantized displacement wavelet coefficients,
   a variable subdivisionIterationCount, indicating the number of subdivision iterations to be applied to the submesh,
   a 1D array levelOfDetailVertexCounts, of size (subdivisionIterationCount+1) indicating the number of vertices associated with each subdivision iteration,
   a 2D array verCoordEdges, of size subdivSubmesh VerCoordCount×2 which indicates for each vertex v produced by the subdivision process. the indices a and b of the two vertices used to generated it (e.g., v is generated as the middle of the edge (a, b)),
   a 1D array update Weights, of size subdivSubmesh VerCoordCount, indicating the lifting update weight.
   a variable predWeights, indicating the lifting prediction weight.
   a variable skipUpdate, indicating whether the update operation should be skipped (when 1) or not (when 0).

The output of this process is:
- a 2D array dispArray, of size subdivSubmesh VerCoord-Count×3, indicating the displacements to be applied to the mesh position.

The inverse wavelet transform process proceeds as follows:

```
for( i = 0; i < subdivisionIterationCount; i++ ) {
  vcount0 = levelOfDetailVertexCounts[ i ]
  vcount1 = levelOfDetailVertexCounts[ i + 1 ]
  for ( v = vcount0; skipUpdate == 0 && v < vcount1; ++v ) {
    a = verCoordEdges[ v ][ 0 ]
    b = verCoordEdges[ v ][ 1 ]
    for( d = 0; d < DisplacementDim; d++ ) {
      disp = updateWeights[ i ] * dispCoeffArray[ v ][ d ]
      dispCoeffArray[ a ][ d ] -= disp
      dispCoeffArray[ b ][ d ] -= disp
    }
  }
  for ( v = vcount0; v < vcount1; ++v ) {
    a = verCoordEdges[ v ][ 0 ]
    b = verCoordEdges[ v ][ 1 ]
    for( d = 0; d < DisplacementDim; d++ ) {
      dispCoeffArray[ v ][ d ] +=
        predWeights * ( dispCoeffArray[ a ][ d ] + dispCoeffArray[ b ][ d ]
    )
    }
  }
}
for ( v = 0; v < verCoordCount; ++v ) {
  for( d = 0; d < DisplacementDim; d++ ) {
    dispArray[ v ][ d ] = dispCoeffArray[ v ][ d ]
  }
}
```

Figure 2:
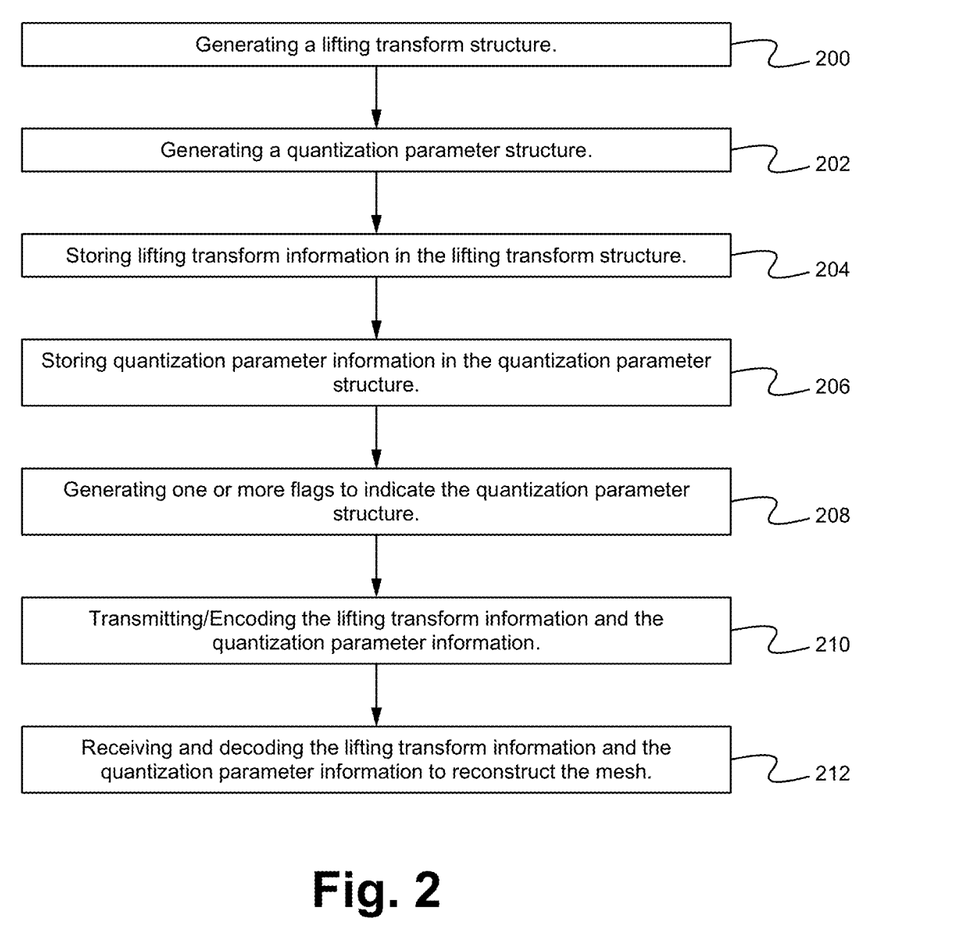
FIG. 2 illustrates a flowchart of a method of implementing an independent structure that contains the quantization-related information according to some embodiments.

FIG. 2 illustrates a flowchart of a method of implementing independent displacement quantization according to some embodiments. In the step 200, a lifting transform structure is generated. The lifting transform structure is able to be any data structure. In the step 202, a quantization parameter structure is generated. The quantization parameter structure is able to be any data structure. The quantization parameter structure is independent of the lifting transform structure. In the step 204, lifting transform information is stored in the lifting transform structure. In the step 206, quantization parameter information is stored in the quantization parameter structure. The information is able to be transformed without being quantized, and the information is able to be quantized without being transformed. In the step 208, one or more flags are generated to indicate the quantization parameter structure. In the step 210, the lifting transform information and the quantization parameter information are transmitted/encoded. Additional information is able to be transmitted/encoded as well. In the step 212, the lifting transform information and the quantization parameter information are received and decoded to reconstruct the mesh. In some embodiments, fewer or additional steps are implemented. In some embodiments, the order of the steps is modified.

Figure 3:
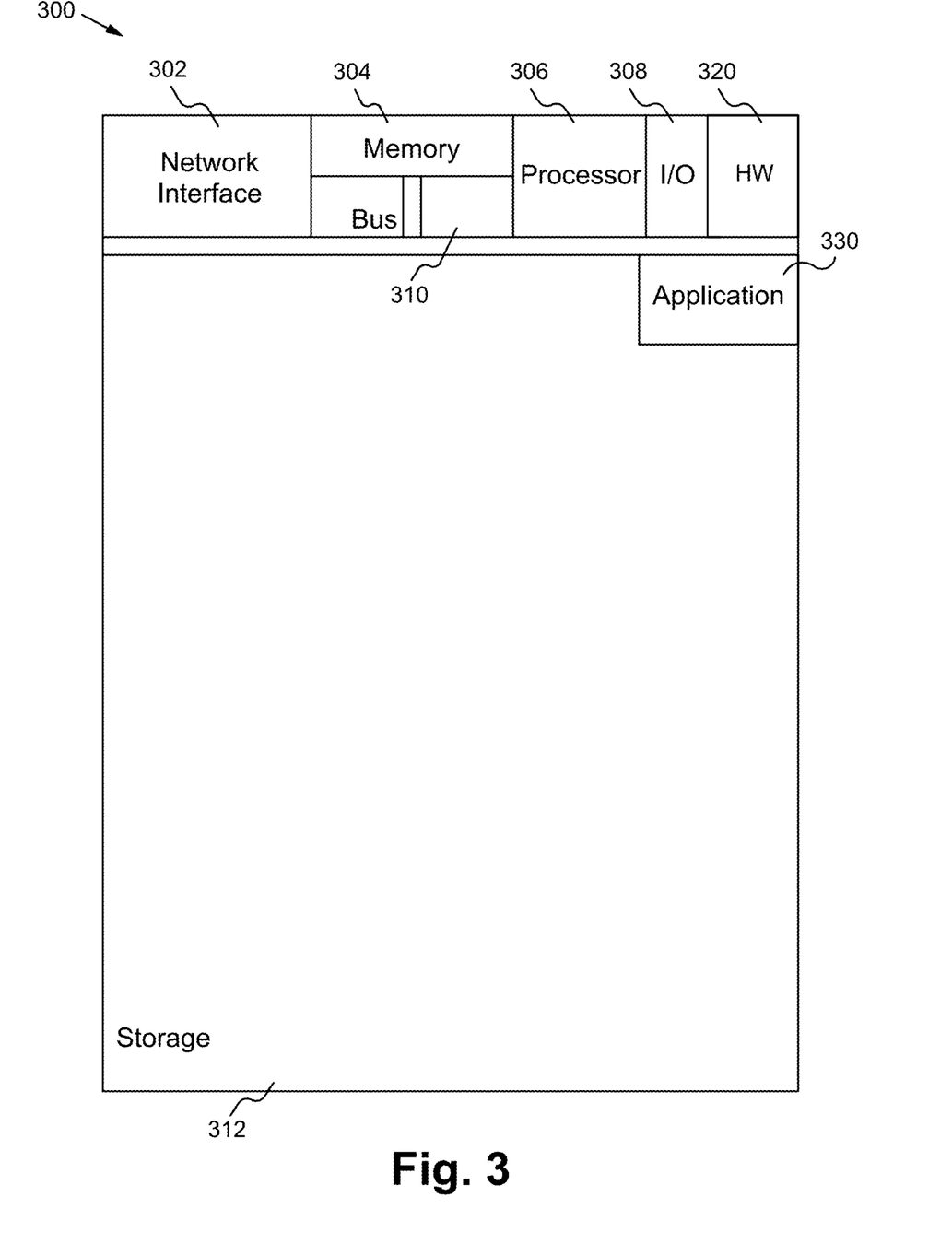
FIG. 3 illustrates a block diagram of an exemplary computing device configured to implement the displacement quantization method according to some embodiments.

FIG. 3 illustrates a block diagram of an exemplary computing device configured to implement the displacement quantization method according to some embodiments. The computing device 300 is able to be used to acquire, store, compute, process, communicate and/or display information such as images and videos including 3D content. The computing device 300 is able to implement any of the encoding/decoding aspects. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Displacement quantization application(s) 330 used to implement the displacement quantization implementation are likely to be stored in the storage device 312 and memory 304 and processed as applications are typically processed. More or fewer components shown in FIG. 3 are able to be included in the computing device 300. In some embodiments, displacement quantization hardware 320 is included. Although the computing device 300 in FIG. 3 includes applications 330 and hardware 320 for the displacement quantization implementation, the displacement quantization method is able to be implemented on a computing device in hardware, firmware, software or any combination thereof. For example, in some embodiments, the displacement quantization applications 330 are programmed in a memory and executed using a processor. In another example, in some embodiments, the displacement quantization hardware 320 is programmed hardware logic including gates specifically designed to implement the displacement quantization method.

In some embodiments, the displacement quantization application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the displacement quantization method, a device acquires or receives 3D content (e.g., point cloud content). The displacement quantization method is able to be implemented with user assistance or automatically without user involvement.

In operation, the displacement quantization method enables the lifting transform and quantization to be implemented independently. For example, displacement information is able to be transformed and quantized, transformed and not quantized, or quantized and not transformed.

Some Embodiments of Displacement Quantization Syntax

1. A method programmed in a non-transitory memory of a device comprising:
    storing lifting transform information in a lifting transform structure; and
    storing quantization parameter information in a quantization parameter structure, wherein the lifting transform structure is independent from the quantization parameter structure.
2. The method of claim 1 further comprising generating the lifting transform structure and the quantization parameter structure.
3. The method of claim 1 further comprising generating one or more flags to indicate the quantization parameter structure.
4. The method of claim 1 further comprising encoding the lifting transform information and the quantization parameter information.
5. The method of claim 1 further comprising reconstructing a mesh with the lifting transform information and the quantization parameter information.
6. The method of claim 1 further comprising encoding displacement information related to a mesh.
7. The method of claim 1 wherein the displacement information is quantized and stored as the quantization parameter information.
8. An apparatus comprising:
    a non-transitory memory for storing an application, the application for:
        storing lifting transform information in a lifting transform structure; and
        storing quantization parameter information in a quantization parameter structure, wherein the lifting transform structure is independent from the quantization parameter structure; and
    a processor coupled to the memory, the processor configured for processing the application.
9. The apparatus of claim 8 wherein the application is further configured for generating the lifting transform structure and the quantization parameter structure.
10. The apparatus of claim 8 wherein the application is further configured for generating one or more flags to indicate the quantization parameter structure.
11. The apparatus of claim 8 wherein the application is further configured for encoding the lifting transform information and the quantization parameter information.
12. The apparatus of claim 8 wherein the application is further configured for reconstructing a mesh with the lifting transform information and the quantization parameter information.
13. The apparatus of claim 8 wherein the application is further configured for encoding displacement information related to a mesh.
14. The apparatus of claim 8 wherein the displacement information is quantized and stored as the quantization parameter information.
15. A system comprising:
    an encoder configured for:
        storing lifting transform information in a lifting transform structure; and
        storing quantization parameter information in a quantization parameter structure, wherein the lifting transform structure is independent from the quantization parameter structure; and
    a decoder configured for reconstructing a mesh with the lifting transform information and the quantization parameter information.
16. The system of claim 15 wherein the encoder is further configured for generating the lifting transform structure and the quantization parameter structure.
17. The system of claim 15 wherein the encoder is further configured for generating one or more flags to indicate the quantization parameter structure.
18. The system of claim 15 wherein the encoder is further configured for encoding the lifting transform information and the quantization parameter information.
19. The system of claim 15 wherein the encoder is further configured for encoding displacement information related to a mesh.
20. The system of claim 15 wherein the displacement information is quantized and stored as the quantization parameter information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    storing lifting transform information in a lifting transform structure; and
    storing quantization parameter information in a quantization parameter structure, wherein the lifting transform structure is independent from the quantization parameter structure.
2. The method of claim 1 further comprising generating the lifting transform structure and the quantization parameter structure.
3. The method of claim 1 further comprising generating one or more flags to indicate the quantization parameter structure.
4. The method of claim 1 further comprising encoding the lifting transform information and the quantization parameter information.
5. The method of claim 1 further comprising reconstructing a mesh with the lifting transform information and the quantization parameter information.

6. The method of claim 1 further comprising encoding displacement information related to a mesh.

7. The method of claim 1 wherein the displacement information is quantized and stored as the quantization parameter information.

8. An apparatus comprising:
a non-transitory memory for storing an application, the application for:
  storing lifting transform information in a lifting transform structure; and
  storing quantization parameter information in a quantization parameter structure, wherein the lifting transform structure is independent from the quantization parameter structure; and
a processor coupled to the memory, the processor configured for processing the application.

9. The apparatus of claim 8 wherein the application is further configured for generating the lifting transform structure and the quantization parameter structure.

10. The apparatus of claim 8 wherein the application is further configured for generating one or more flags to indicate the quantization parameter structure.

11. The apparatus of claim 8 wherein the application is further configured for encoding the lifting transform information and the quantization parameter information.

12. The apparatus of claim 8 wherein the application is further configured for reconstructing a mesh with the lifting transform information and the quantization parameter information.

13. The apparatus of claim 8 wherein the application is further configured for encoding displacement information related to a mesh.

14. The apparatus of claim 8 wherein the displacement information is quantized and stored as the quantization parameter information.

15. A system comprising:
an encoder configured for:
  storing lifting transform information in a lifting transform structure; and
  storing quantization parameter information in a quantization parameter structure, wherein the lifting transform structure is independent from the quantization parameter structure; and
a decoder configured for reconstructing a mesh with the lifting transform information and the quantization parameter information.

16. The system of claim 15 wherein the encoder is further configured for generating the lifting transform structure and the quantization parameter structure.

17. The system of claim 15 wherein the encoder is further configured for generating one or more flags to indicate the quantization parameter structure.

18. The system of claim 15 wherein the encoder is further configured for encoding the lifting transform information and the quantization parameter information.

19. The system of claim 15 wherein the encoder is further configured for encoding displacement information related to a mesh.

20. The system of claim 15 wherein the displacement information is quantized and stored as the quantization parameter information.

* * * * *